US012166323B2

(12) United States Patent
Nishimura et al.

(10) Patent No.: US 12,166,323 B2
(45) Date of Patent: Dec. 10, 2024

(54) CRIMP TERMINAL AND TERMINAL-ATTACHED WIRE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Naoya Nishimura, Mie (JP); Taiji Mochizuki, Mie (JP); Kenji Miyamoto, Mie (JP); Kazuhiro Washio, Mie (JP)

(73) Assignees: AUTONETWORKS TECHNOLOGIES. LTD., Mie (JP); SUMITOMOM WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 377 days.

(21) Appl. No.: 17/783,272

(22) PCT Filed: Dec. 7, 2020

(86) PCT No.: PCT/JP2020/045444
§ 371 (c)(1),
(2) Date: Jun. 8, 2022

(87) PCT Pub. No.: WO2021/124949
PCT Pub. Date: Jun. 24, 2021

(65) Prior Publication Data
US 2023/0006369 A1 Jan. 5, 2023

(30) Foreign Application Priority Data
Dec. 17, 2019 (JP) ................................ 2019-227110

(51) Int. Cl.
*H01R 4/18* (2006.01)

(52) U.S. Cl.
CPC ............ *H01R 4/188* (2013.01); *H01R 4/184* (2013.01)

(58) Field of Classification Search
CPC ................................ H01R 4/184; H01R 4/188
See application file for complete search history.

(56) References Cited

U.S. PATENT DOCUMENTS

2018/0145426 A1 5/2018 Shimada et al.
2019/0074604 A1 * 3/2019 Furuhata ................. H01R 4/18

FOREIGN PATENT DOCUMENTS

EP 2045879 A1 4/2009
JP S54-150989 U 10/1979
(Continued)

OTHER PUBLICATIONS

International Search Report issued on Feb. 16, 2021 for WO 2021/124949 A1 (5 pages).

*Primary Examiner* — Jean F Duverne
(74) *Attorney, Agent, or Firm* — Venjuris, P.C.

(57) ABSTRACT

The present disclosure provides a crimp terminal in which a core wire is kept from coming loose. The crimp terminal 14 includes a plate-like crimp portion 15 that is to be crimped to a core wire of an electric wire by being deformed so as to wrap around the core wire, and a protruding portion 16 that protrudes from the inner surface of the crimp portion 15. A groove 21 that extends along a direction that intersects the extending direction of the core wire is provided in the protruding portion 16.

8 Claims, 3 Drawing Sheets

(56) References Cited

FOREIGN PATENT DOCUMENTS

| | | | | | |
|---|---|---|---|---|---|
| JP | S56-099775 | U | | 8/1981 | |
| JP | 2010049982 | A | * | 3/2010 | |
| JP | 2010055937 | A | * | 3/2010 | ............. H01R 4/185 |
| JP | 2012-009384 | A | | 1/2012 | |
| WO | 2009-128344 | A1 | | 10/2009 | |
| WO | WO-2017212920 | A1 | * | 12/2017 | ............... H01R 4/18 |

* cited by examiner

CRIMP TERMINAL AND TERMINAL-ATTACHED WIRE

CROSS REFERENCE TO RELATED APPLICATIONS

This application is a national phase of PCT application No. PCT/JP2020/045444, filed on 7 Dec. 2020, which claims priority from Japanese patent application No. 2019-227110, filed on 17 Dec. 2019, all of which are incorporated herein by reference.

TECHNICAL FIELD

The present disclosure relates to a crimp terminal and a terminal-attached wire.

BACKGROUND

Heretofore, some crimp terminals that are crimped to core wires of electric wires have a plate-like crimp portion that is crimped to a core wire of an electric wire by being deformed so as to wrap around the core wire, and a protruding portion that protrudes from the inner surface of the crimp portion (for example, see Patent Document 1). This crimp terminal includes a bent portion that extends from the crimp portion and is bent, and the protruding portion is easily manufactured due to being continuous with the bent portion. In addition, the protruding portion includes an extending portion that extends from the bent portion along the extending direction of the core wire and an intersection portion that extends in a direction that intersects the extending portion, and the intersection portion in particular is disposed to dig into the core wire in a crimped state. Thus, particularly if the core wire is made of an aluminum-based metal or the like, the oxide layer on the surface of the core wire is broken by the intersection portion to reduce the electrical resistance of the surface, and favorable electrical connection of the core wire is secured. In addition, in some crimp terminals such as those described above, a groove that extends along a direction orthogonal to the extending direction of the core wire is provided in the inner surface of the crimp portion (for example, see Patent Document 1 (FIGS. 23 to 25)).

PRIOR ART DOCUMENT

Patent Document

Patent Document 1: JP 2018-085232A

SUMMARY OF THE INVENTION

Problems to be Solved

However, there has been a problem with the above-described crimp terminal in that the core wire in a crimped state can easily come loose. Particularly, as described above, if the protruding portion includes an extending portion that extends along the extending direction of the core wire, a portion of the core wire that abuts on the extending portion can easily come loose.

The present invention has been made in order to solve the aforementioned issue, and aims to provide a crimp terminal and a terminal-attached wire that keep a core wire from coming loose.

Means to Solve the Problem

A crimp terminal according to the present disclosure is a crimp terminal that includes a plate-like crimp portion configured to be crimped to a core wire of an electric wire by being deformed so as to wrap around the core wire, and a protruding portion that protrudes from an inner surface of the crimp portion, and a groove that extends along a direction that intersects an extending direction of the core wire is provided in the protruding portion.

A terminal-attached wire according to the present disclosure includes the crimp terminal and the electric wire to which the crimp terminal is crimped.

Effect of the Invention

According to a crimp terminal and a terminal-attached wire according to the present disclosure, a core wire is kept from coming loose.

DETAILED DESCRIPTION TO EXECUTE THE INVENTION

Description of Embodiments of Present Disclosure

Figure 1:
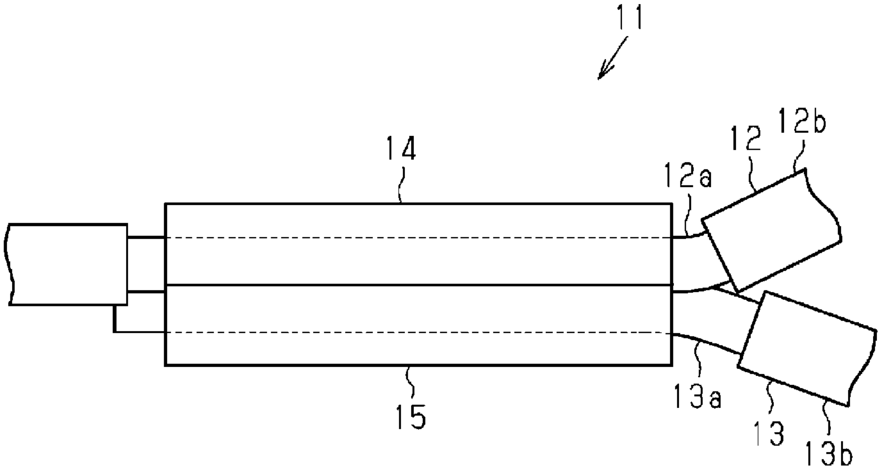
FIG. 1 is a partial plan view of a terminal-attached wire according to one embodiment.

First, embodiments of the present disclosure will be listed and described.

[1] A crimp terminal according to the present disclosure includes a plate-like crimp portion configured to be crimped to a core wire of an electric wire by being deformed so as to wrap around the core wire, and a protruding portion that protrudes from an inner surface of the crimp portion, and a groove that extends along a direction that intersects an extending direction of the core wire is provided on the protruding portion.

With such a configuration, a groove that extends along a direction that intersects the extending direction of the core wire is provided in the protruding portion that protrudes from the inner surface of the crimp portion, and thus the core wire in the crimped state is kept from coming loose.

[2] The groove extends along a direction orthogonal to the extending direction of the core wire.

With such a configuration, the groove extends along a direction orthogonal to the extending direction of the core wire, and thus the core wire is further kept from coming loose.

[3] The crimp terminal further includes a bent portion that extends from the crimp portion and is bent, and the protruding portion is continuous with the bent portion.

With such a configuration, the bent portion that extends from the crimp portion and is bent is provided, and the protruding portion is continuous with the bent portion, and thus, the protruding portion can be more easily provided, for example, compared with a case where a separate protruding portion is provided by being fixed to the crimp portion.

[4] The protruding portion has an extending portion that extends from the bent portion along the extending direction of the core wire, and an intersection portion that extends, on the inner surface of the crimp portion, in a direction that intersects the extending portion, and the groove is provided in the extending portion.

With such a configuration, the protruding portion includes the extending portion that extends from the bent portion along the extending direction of the core wire and the intersection portion that extends in a direction that intersects the extending portion, and the groove is provided in the extending portion, and thus it is possible to effectively keep the core wire from coming loose. That is to say, the extending portion extends along the extending direction of the core wire, and abuts against the core wire over a long range in a direction in which the core wire could come loose, and it is possible to keep the core wire from easily moving in the direction in which the core wire could come loose if the groove is not disposed in the extending portion, and to effectively keep the core wire from coming loose.

[5] An internal groove that extends along a direction that intersects the extending direction of the core wire is provided in at least a portion of the inner surface of the crimp portion.

With such a configuration, the internal groove that extends along a direction that intersects the extending direction of the core wire is provided in at least a portion of the inner surface of the crimp portion, and thus the core wire is further kept from coming loose.

[6] The groove is provided at a position displaced from the internal groove in the extending direction of the core wire.

With such a configuration, the groove is provided at a position displaced from the internal groove in the extending direction of the core wire, and thus the core wire in the crimped state is further kept from coming loose.

[7] A terminal-attached wire according to the present disclosure includes the crimp terminal and the electric wire to which the crimp terminal is crimped.

With such a configuration, in the electric wire having the terminal, the core wire is kept from coming loose.

Detailed Embodiments of Present Disclosure

Specific examples of a terminal-attached wire according to the present disclosure will be described below with reference to the drawings. Note that the present invention is not limited to these examples, but is indicated by the claims, and all changes that come within the meaning and range of equivalency of the claims are intended to be embraced therein.

As shown in FIG. 1, a terminal-attached wire 11 includes a plurality of electric wires 12 and 13 and a crimp terminal 14. The electric wires 12 and 13 include core wires 12*a* and 13*a* and insulation coatings 12*b* and 13*b* that cover the core wires 12*a* and 13*a*, respectively, and portions of the insulation coatings 12*b* and 13*b* are removed. Moreover, the crimp terminal 14 is crimped to the core wires 12*a* and 13*a* at positions thereof that have been exposed due to the insulation coatings 12*b* and 13*b* having been removed. Note that the core wires 12*a* and 13*a* according to this embodiment are made of an aluminum-based metal.

Figure 2:
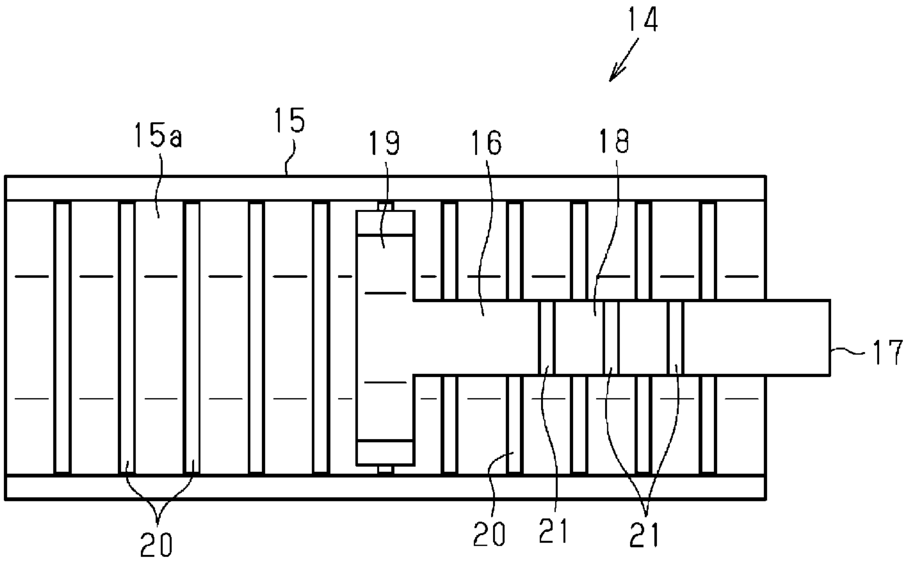
FIG. 2 is a plan view of a crimp terminal according to one embodiment.
Figure 3:
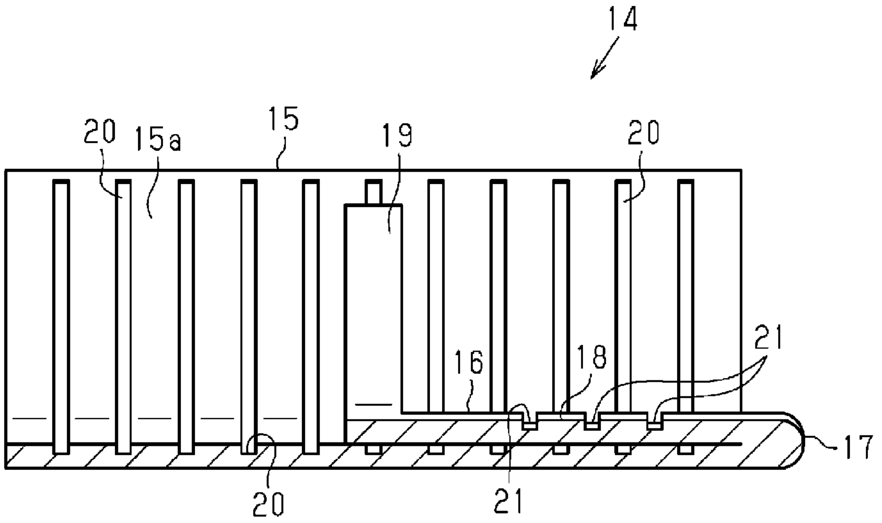
FIG. 3 is a cross-sectional view of a crimp terminal according to one embodiment.
Figure 4:
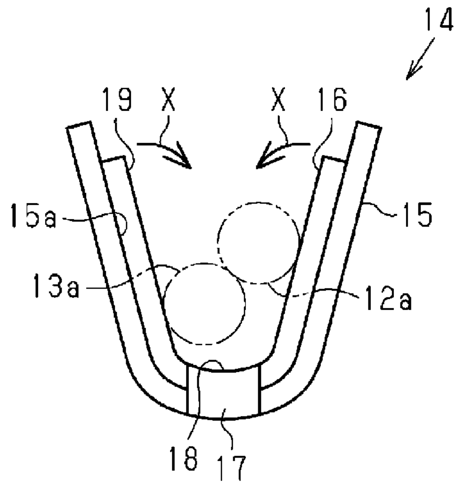
FIG. 4 is a side view of a crimp terminal according to one embodiment.

As shown in FIGS. 2 to 4, the crimp terminal 14 includes a plate-like crimp portion 15 that is crimped to the core wires 12*a* and 13*a* by being deformed so as to wrap around the core wires 12*a* and 13*a*, and a protruding portion 16 that protrudes from an inner surface 15*a* of the crimp portion 15. Note that FIGS. 2 and 3 show a state before the crimp terminal 14 is crimped to the core wires 12*a* and 13*a*, and do not illustrate the core wires 12*a* and 13*a*, but a description will be given assuming that the right-left direction in FIGS. 2 and 3 is the extending direction of the core wires 12*a* and 13*a*, which is the direction in which the core wires 12*a* and 13*a* extend when disposed. In addition, as shown in FIG. 4, in a state before the crimp terminal 14 is crimped to the core wires 12*a* and 13*a*, the crimp portion 15 according to this embodiment is formed to be curved in a substantially U-like shape such that the core wires 12*a* and 13*a* can be housed when viewed from the extending direction of the core wires 12*a* and 13*a*, and the surface on the side on which the core wires 12*a* and 13*a* are housed is the inner surface 15*a*.

To be specific, the crimp terminal 14 includes a bent portion 17 that extends from the crimp portion 15 and is bent, and the protruding portion 16 is continuous with the bent portion 17. The bent portion 17 according to this embodiment extends from the center of the end portion, with respect to the extending direction of the core wires 12*a* and 13*a*, of the crimp portion 15. In addition, the protruding portion 16 is provided so as to abut against the inner surface 15*a* of the crimp portion 15, and includes an extending portion 18 that extends from the bent portion 17 along the extending direction of the core wires 12*a* and 13*a*, and an intersection portion 19 that extends from the leading end of the extending portion 18 in a direction that intersects the extending portion 18. On the inner surface 15*a* of the crimp portion 15, the intersection portion 19 according to this embodiment extends from the leading end of the extending portion 18 in the two directions orthogonal to the leading end of the extending portion 18. In addition, the intersection portion 19 is disposed at the center of the crimp portion 15 in the extending direction of the core wires 12*a* and 13*a*.

In addition, internal grooves 20 that extend along a direction that intersects the extending direction of the core wires 12*a* and 13*a* are provided in the inner surface 15*a* of the crimp portion 15. The internal grooves 20 according to this embodiment extend along the direction orthogonal to the extending direction of the core wires 12*a* and 13*a*. In addition, the internal grooves 20 are provided at a regular interval in the extending direction of the core wires 12*a* and 13*a*, and are provided over the entire region of the inner surface 15*a* of the crimp portion 15.

In addition, grooves 21 that extend along a direction that intersects the extending direction of the core wires 12*a* and 13*a* are provided in the protruding portion 16. The grooves 21 according to this embodiment are provided in the extending portion 18 of the protruding portion 16. In addition, the grooves 21 extend along the direction orthogonal to the extending direction of the core wires 12*a* and 13*a*. In addition, the plurality of grooves 21 are provided at a regular interval in the extending direction of the core wires 12*a* and 13*a*. In addition, the grooves 21 are provided at positions displaced from the internal grooves 20 in the extending direction of the core wires 12*a* and 13*a*, and are disposed alternately with the internal grooves 20.

Next, actions of the terminal-attached wire 11 configured as described above will be described.

As shown in FIG. 4, the core wires 12*a* and 13*a* are housed on the inner side of the crimp portion 15 before being crimped, and the crimp terminal 14 is then crimped to the core wires 12*a* and 13*a* by the crimp portion 15 being deformed so as to wrap around the core wires 12*a* and 13*a* as schematically indicated by arrows X in FIG. 4. In this terminal-attached wire 11, particularly the intersection portion 19 of the protruding portion 16 is disposed so as to dig into the core wires 12*a* and 13*a*, and thereby the oxide layers on the surfaces of the core wires 12*a* and 13*a* are broken to reduce the electrical resistance of the surfaces, and favorable electrical connection between the core wires 12*a* and 13*a* is secured.

Next, effects of the above embodiment will be described below.

(1) The grooves 21 that extend along a direction that intersects the extending direction of the core wires 12*a* and 13*a* are provided in the protruding portion 16 that protrudes from the inner surface of the crimp portion 15, and thus the core wires 12*a* and 13*a* in the crimped state are kept from coming loose.

(2) The grooves 21 extend along a direction orthogonal to the extending direction of the core wires 12*a* and 13*a*, and thus the core wires 12*a* and 13*a* are further kept from coming loose.

(3) The crimp terminal 14 includes the bent portion 17 that extends from the crimp portion 15 and is bent, and the protruding portion 16 is continuous with the bent portion 17, and thus, for example, the protruding portion 16 can be easily provided compared with a case where a separate protruding portion is provided by being fixed to the crimp portion 15.

(4) The protruding portion 16 has the extending portion 18 that extends from the bent portion 17 along the extending direction of the core wires 12*a* and 13*a*, and the intersection portion 19 that extends in a direction that intersects the extending portion 18, and the grooves 21 are provided in the extending portion 18, and thus it is possible to effectively keep the core wires 12*a* and 13*a* from coming loose. That is to say, the extending portion 18 extends along the extending direction of the core wires 12*a* and 13*a*, and abuts against the core wires 12*a* and 13*a* over a long range in the direction in which the core wires 12*a* and 13*a* could come loose, and it is possible to keep the core wires 12*a* and 13*a* from easily moving in the direction in which the core wires 12*a* and 13*a* could come loose if the grooves 21 are not provided in the extending portion 18, and to effectively keep the core wires 12*a* and 13*a* from coming loose.

(5) The internal grooves 20 that extend along a direction that intersects the extending direction of the core wires 12*a* and 13*a* are provided in the inner surface 15*a* of the crimp portion 15, and thus the core wires 12*a* and 13*a* are further kept from coming loose.

(6) It is possible to eliminate constraints on the arrangement of the core wires 12*a* and 13*a* on the crimp terminal 14 when the crimp terminal 14 is crimped to the core wires 12*a* and 13*a*. That is to say, for example, in a configuration in which the grooves 21 are not provided and only the internal grooves 20 are provided, unless the core wires 12*a* and 13*a* are disposed to oppose the internal grooves 20, the core wires 12*a* and 13*a* can easily come loose, but, in a configuration in which the grooves 21 are provided, no matter how the core wires 12*a* and 13*a* are disposed, the core wires 12*a* and 13*a* oppose the internal grooves 20 or the grooves 21, making the core wires 12*a* and 13*a* unlikely to come loose.

(7) The grooves 21 are provided at positions displaced from the internal grooves 20 in the extending direction of the core wires 12*a* and 13*a*, and thus the core wires 12*a* and 13*a* in the crimped state are further kept from coming loose.

The embodiment can be modified and implemented as described below. The above-described embodiment and the following modifications can be combined with each other and implemented as long as there is no technical contradiction.

In the above embodiment, the grooves 21 are provided at positions displaced from the internal grooves 20 in the extending direction of the core wires 12*a* and 13*a*, and are disposed alternately with the internal grooves 20, but there is no limitation thereto, and the grooves 21 may be disposed with a different positional relation with the internal grooves 20.

Figure 5:
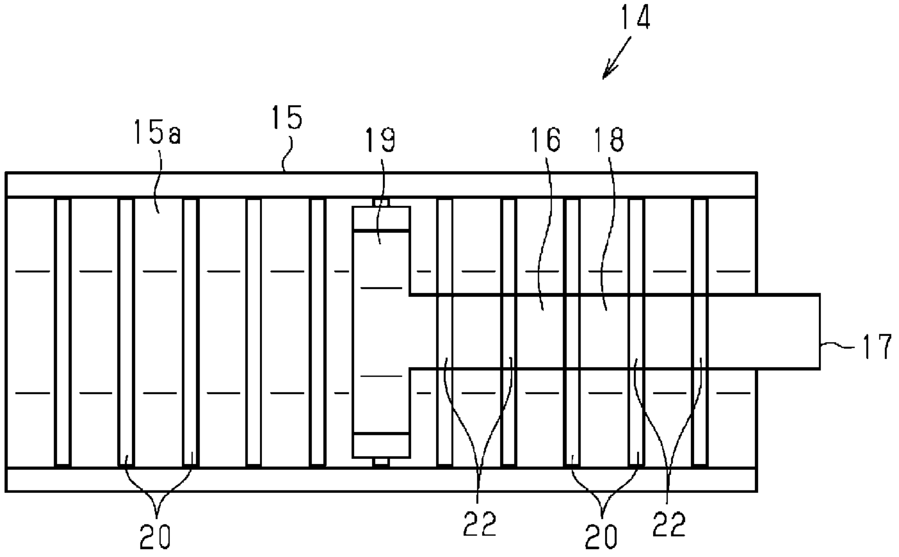
FIG. 5 is a plan view of a crimp terminal in another example.

As shown in FIG. 5, for example, grooves 22 may be disposed at the same positions as the internal grooves 20 in the extending direction of the core wires 12*a* and 13*a*. In addition, the internal grooves 20 and the grooves 21 may be provided at equal intervals or at irregular intervals.

In the above embodiment, the grooves 21 extend along the direction orthogonal to the extending direction of the core wires 12*a* and 13*a*, but there is no limitation thereto, and the grooves 21 may extend in another direction.

Figure 6:
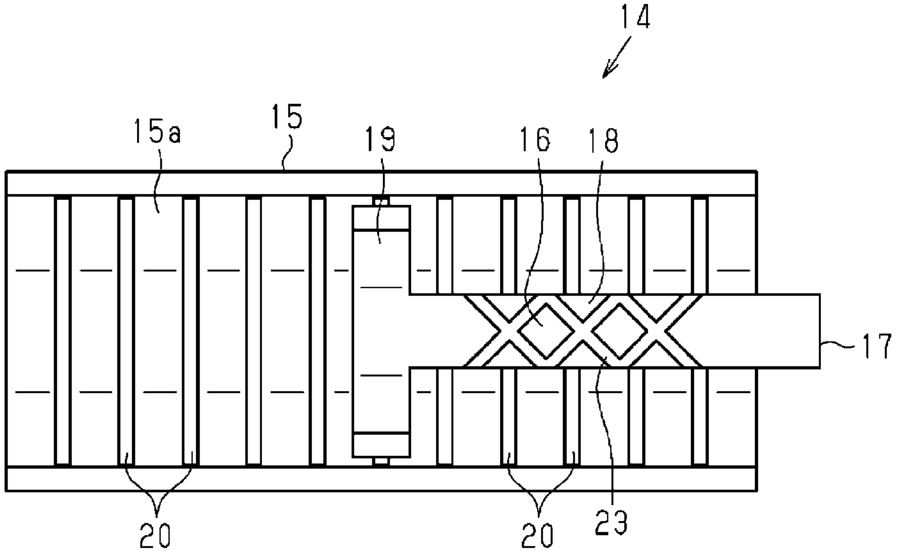
FIG. 6 is a plan view of a crimp terminal in another example.

As shown in FIG. 6, for example, grooves 23 may extend along directions that intersect the extending direction of the core wires 12*a* and 13*a*, and two or more of them may intersect each other.

In the above embodiment, the crimp terminal 14 includes the bent portion 17 that extends from the crimp portion 15 and is bent, and the protruding portion 16 is continuous with the bent portion 17, but there is no limitation thereto, and, for example, a separate protruding portion may be provided by being fixed to the crimp portion 15.

In the above embodiment, the protruding portion 16 includes the extending portion 18 that extends from the bent portion 17 along the extending direction of the core wires 12*a* and 13*a*, and the intersection portion 19 that extends in a direction that intersects the extending portion 18, and the grooves 21 are provided in the extending portion 18, but there is no limitation thereto, and the shape of the protruding portion may be changed to another shape, and the positions at which the grooves 21 are provided may be changed.

In the above embodiment, the internal grooves 20 that extend along a direction that intersects the extending direction of the core wires 12*a* and 13*a* are provided in the inner surface 15*a* of the crimp portion 15, but there is no limitation thereto, and a configuration may also be adopted in which the internal grooves 20 are not provided. In addition, the direction in which the internal grooves 20 extend and the region in which the internal grooves 20 are provided may be changed.

In the above embodiment, the terminal-attached wire 11 includes two electric wires, namely the electric wires 12 and 13, but there is no limitation thereto, and the terminal-attached wire 11 may include one electric wire or three or more electric wires. That is to say, the crimp terminal 14 may be crimped to the core wire of one electric wire or the core wires of three or more electric wires.

In the above embodiment, the core wires 12*a* and 13*a* of the electric wires 12 and 13 are made of an aluminum-based metal, but there is no limitation thereto, and the core wires 12*a* and 13*a* may also be made of a copper-based metal, for example.

The present disclosure includes the following implementation examples. The reference numerals for some components of the illustrative embodiments are added in order to facilitate understanding, not to limit the present invention. Some of the items described in the following implementation examples may be omitted, and some of the items described in the implementation examples may be selected or extracted and combined.

[Supplementary Note 1] A crimp terminal (14) according to one or more implementation examples of the present disclosure that is to be crimped to a core wire (12*a*) of an electric wire (12) includes:

a crimp portion (15) that has a U-like shape when viewed in cross section and includes an inner surface that defines a housing space for the electric wire (12); and a pressing piece (16) disposed on the inner surface of the crimp portion (15), wherein the pressing piece (16) includes a first surface that comes into contact with the inner surface of the crimp portion (15), and a second surface that is on a side opposite to the first surface and is exposed to the housing space for the electric wire (12), and a plurality of grooves (21) that extend along a direction that intersects a longitudinal direction of the crimp portion (15) are formed in the second surface of the pressing piece (16).

[Supplementary Note 2] In several implementation examples of the present disclosure, the pressing piece (16) can have an elongated shape, and be disposed along the longitudinal direction of the crimp portion (15).

[Supplementary Note 3] In several implementation examples of the present disclosure, the plurality of grooves (21) can be formed over the entire width of the second surface of the pressing piece (16).

[Supplementary Note 4] In several implementation examples of the present disclosure, a configuration can be adopted in which a plurality of internal grooves (20) that extend along a direction that intersects the longitudinal direction of the crimp portion (15) are formed in the inner surface of the crimp portion (15), and the plurality of internal grooves (20) are not formed in two end portions that oppose each other in a width direction of the crimp portion (15).

[Supplementary Note 5] In several implementation examples of the present disclosure, the crimp portion can include a bottom plate, a first side wall that extends from a first end portion of the bottom plate in a width direction of the bottom plate, and a second side wall that extends from a second end portion on a side opposite to the first end portion of the bottom plate, and the pressing piece (16) can be disposed on the bottom plate along a longitudinal direction of the bottom plate.

[Supplementary Note 6] The plurality of grooves (21) can be formed at a center portion of the second surface of the pressing piece (16) in a longitudinal direction of the pressing piece (16).

LIST OF REFERENCE NUMERALS

11 Terminal-attached wire
12 Electric wire
12*a* Core wire
12*b* Insulation coating
13 Electric wire
13*a* Core wire
13*b* Insulation coating
14 Crimp terminal
15 Crimp portion
15*a* Inner surface
16 Protruding portion
17 Bent portion
18 Extending portion
19 Intersection portion
20 Internal groove
21 to 23 Groove

What is claimed is:

1. A crimp terminal comprising:

a plate-like crimp portion configured to be crimped to a core wire of an electric wire by being deformed so as to wrap around the core wire; and a protruding portion that protrudes from an inner surface of the crimp portion, wherein a plurality of grooves that extend along a direction that intersects an extending direction of the core wire are provided in the protruding portion, the crimp terminal further comprises a bent portion that extends from the crimp portion in the extending direction of the core wire and is bent, the protruding portion is continuous with the bent portion, a plurality of internal grooves that extend along a direction that intersects the extending direction of the core wire are provided over an entire region of an inner surface of the crimp portion, and the plurality of grooves extend along a direction orthogonal to the extending direction of the core wire and are provided at a regular interval in the extending direction of the core wire.

2. The crimp terminal according to claim 1, wherein the protruding portion has an extending portion that extends from the bent portion along the extending direction of the core wire, and an intersection portion that extends in a direction that intersects the extending portion, and the plurality of grooves are provided in the extending portion.

3. The crimp terminal according to claim 1, wherein the plurality of grooves are provided at positions displaced from the plurality of internal grooves in the extending direction of the core wire.

4. A terminal-attached wire comprising:

the crimp terminal according to claim 1; and the electric wire to which the crimp terminal is crimped.

5. A crimp terminal comprising:

a plate-like crimp portion configured to be crimped to a core wire of an electric wire by being deformed so as to wrap around the core wire; and a protruding portion that protrudes from an inner surface of the crimp portion, wherein a plurality of grooves that extend along a direction that intersects an extending direction of the core wire are provided in the protruding portion, the crimp terminal further comprises a bent portion that extends from the crimp portion in the extending direction of the core wire and is bent, the protruding portion is continuous with the bent portion, a plurality of internal grooves that extend along a direction that intersects the extending direction of the core wire are provided over an entire region of an inner surface of the crimp portion, and the plurality of grooves include two or more grooves that extend along directions that intersect the extending direction of the core wire and intersect each other.

6. The crimp terminal according to claim 5, wherein the protruding portion has an extending portion that extends from the bent portion along the extending direction of the core wire, and an intersection portion that extends in a direction that intersects the extending portion, and the plurality of grooves are provided in the extending portion.

7. The crimp terminal according to claim 5, wherein the plurality of grooves are provided at positions displaced from the plurality of internal grooves in the extending direction of the core wire.

8. A terminal-attached wire comprising:

the crimp terminal according to claim 5; and the electric wire to which the crimp terminal is crimped.

* * * * *